(12) United States Patent
Horii et al.

(10) Patent No.: US 6,253,868 B1
(45) Date of Patent: Jul. 3, 2001

(54) STRUCTURE OF PIVOT PORTION OF REAR SWING ARM

(75) Inventors: Yoshiyuki Horii; Kenji Muto; Toshio Matsuno, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/393,156

(22) Filed: Sep. 10, 1999

(30) Foreign Application Priority Data

Nov. 9, 1998 (JP) .................................................. 10-276575

(51) Int. Cl.[7] ..................................................... B62K 25/04
(52) U.S. Cl. ........................... 180/227; 280/284; 280/288
(58) Field of Search ................................... 180/218, 219, 180/227, 226; 280/283, 284, 285, 288

(56) References Cited

U.S. PATENT DOCUMENTS

| | | | |
|---|---|---|---|
| 4,540,062 | * 9/1985 | Kashiwai | 180/227 |
| 5,007,497 | * 4/1991 | Trema | 180/219 |
| 5,487,443 | * 1/1996 | Thurm | 180/227 |
| 5,960,902 | * 10/1999 | Mancini et al. | 180/227 |
| 6,098,736 | * 8/2000 | Smith | 180/227 |

FOREIGN PATENT DOCUMENTS 62-60491 U   4/1987  (JP) .

* cited by examiner

Primary Examiner—Paul N. Dickson
Assistant Examiner—Avraham H. Lerner
(74) Attorney, Agent, or Firm—Birch, Stewart, Kolasch & Birch, LLP

(57) ABSTRACT

A pivot frame is formed as a casting of an aluminum alloy in a substantially U-shaped manner to be open toward a front side. Attaching bosses of a crankcase are placed between a left sidewall and a right sidewall of the pivot frame. Bearing portions of a rear swing arm are coaxially arranged on outer sides of the pivot frame. A pivot bolt is penetrated from one side and is fastened by a nut on the other side. An adjustment collar is interposed between the attaching boss and the right sidewall of the pivot frame. A side of a fixed portion of the adjustment collar is fixed to the right sidewall, and a side of a movable portion of the adjustment collar is pivoted by a tool. The adjustment collar allows the fastening torque of the nut to be constant, thereby preventing deformation from occurring in a fastening operation even when a pivot plate of an aluminum alloy is used.

13 Claims, 7 Drawing Sheets

STRUCTURE OF PIVOT PORTION OF REAR SWING ARM

BACKGROUND OF THE INVENTION

1. Field of the Invention

The present invention relates to the structure of a pivot portion of a rear swing arm of a motorcycle.

2. Description of the Background Art

A pivot structure of a rear swing arm of a motorcycle is known in which a pair of left and right pivot plates made of iron are used. Front ends of a rear swing arm are placed between the left and right pivot plates, and coupled by a pivot bolt. An adjusting collar is installed at a bolt through hole of one of the pivot plates (refer to JP-A-62-60491U).

The above-described pivot structure is a structure fastened together by an axial force produced by a bolt-and-nut coupling. The adjusting collar is present and therefore, deformation of the left and right pivot plates can be reduced. However, when the pivot plates are arranged on inner sides of the rear swing arms, such a fastening structure cannot be adopted. Therefore, there is desired an adjusting mechanism which may be used even in an arrangement where vehicle body frame members such as pivot plates are arranged on inner sides of rear swing arms.

Further, in the case of a backbone type vehicle frame, when it is of a type in which rear swing arms are interposed between a pair of left end right pivot plates, other parts of a carburetor and the like are difficult to lay out without interfering with the vehicle body frame and therefore, integral formation of a center frame is also desired.

Further, in view of promoting frame rigidity, it would be desirable to also connect a crankcase of an engine at the pivot portion along a single axis. The present invention resolves such problems.

SUMMARY OF THE INVENTION

It is therefore an object of the present invention to provide a structure of a pivot portion of a rear swing arm. A single piece of a center frame constituting a backbone type vehicle body frame is arranged in an up and down direction on a rear side of an engine. Attaching portions installed on left and right sides of a front end portion of a rear swing arm are coupled to pivot plates installed at a lower portion of the center frame by a pivot shaft. The pivot plates are provided with sidewalls on left and right sides. The left and right sidewalls are arranged between the left and right attaching portions of the rear swing arm. The attaching portions of a crankcase are placed between the left and right sidewalls. An adjusting collar is placed between the crankcase and one of the left and right sidewalls. These elements are coupled together by a pivot shaft.

The adjusting collar has a screw portion and a nut coupled thereto. The adjusting collar can be withdrawn from and inserted through a window hole formed at a rear face wall of the center frame. A pivot lock portion of the collar having the screw portion projected from the window hole and engaged with a side of the center frame is brought into contact with the side of the center frame.

The adjusting collar is interposed between either of the left and right sidewalls and the attaching portion of the crankcase. Accordingly, a distance between the left and right sidewalls can be made constant. Therefore, even when the pivot plates are fastened up by a bolt and a nut, tolerances of the coupled portions are adjusted between the attaching portion of the rear swing arm on the outer side and the sidewall, and deformation of the sidewalls can be reduced. The occurrence of residual stresses can be reduced. Accordingly, even when the pivot plates are made of an aluminum alloy, sufficient fastening is made feasible.

Further, a distance between the left and right sidewalls can be made constant by the crankcase and the adjusting collar, and the structure can withstand axial force by utilizing the rigidity of the crankcase. By coupling the crankcase to the center frame along with the rear swing arms in a single axis, the frame rigidity is promoted.

The adjusting collar can be withdrawn from and inserted through the window hole provided at the rear face wall of the pivot plates and therefore, the adjusting collar can be mounted even after an engine is placed between the left and right sidewalls. Therefore, in an assembling operation, there is no restriction caused by the mounting procedure of the adjusting collar. The operational efficiency is excellent and attachment and detachment of the engine is facilitated. The adjusting collar includes an engaging portion for pivot locking, and thereby the adjusting operation of the adjusting collar is facilitated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 2:
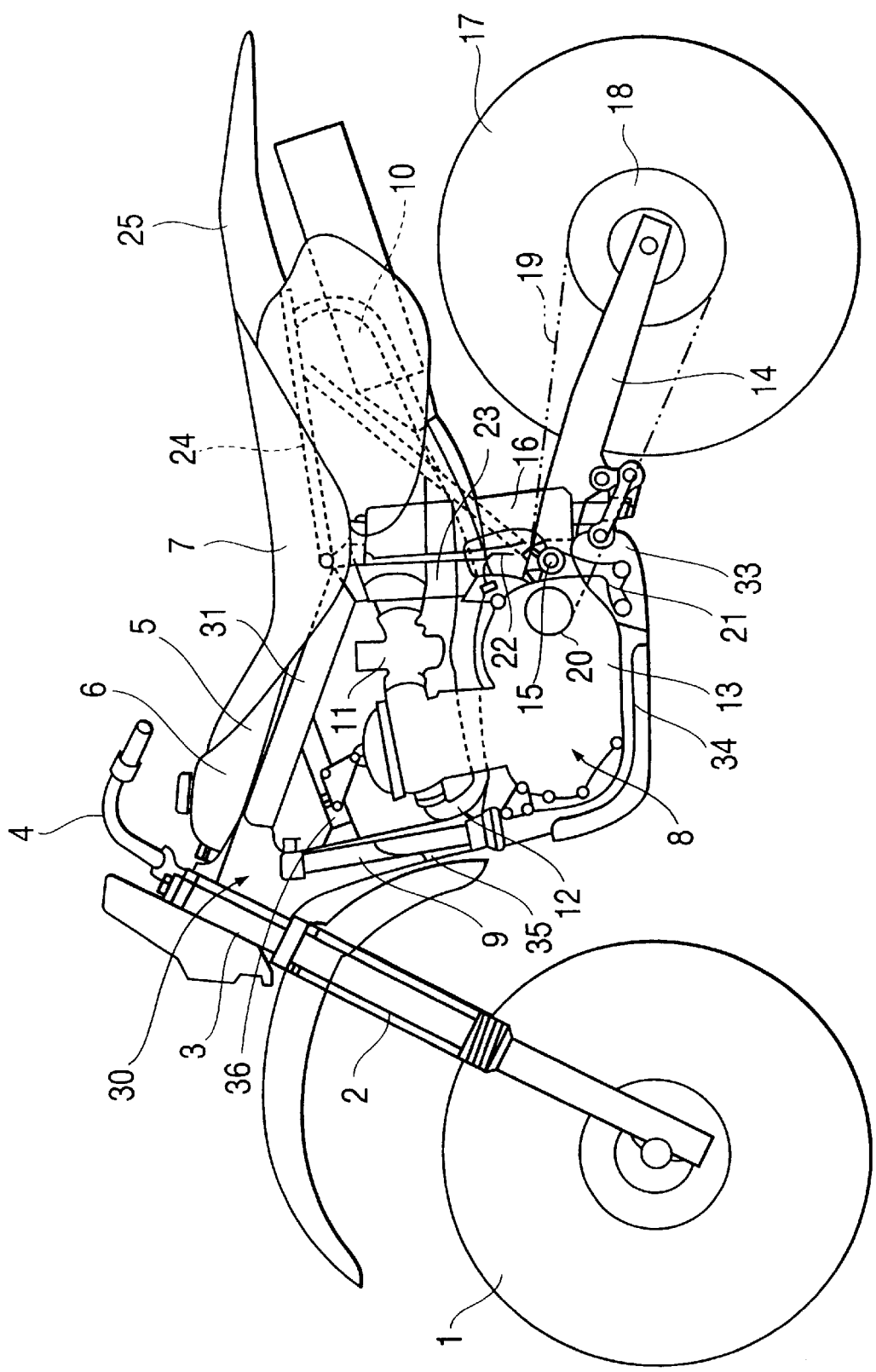
FIG. 2 is a side view of a motorcycle to which the embodiment is applied.

An explanation will be given of an embodiment with reference to the drawings. First, an explanation will be given of an outline structure of a motorcycle with reference to FIG. 2. An upper portion of a front fork 2 supporting a front end 1 is attached to a head pipe 3 and is supported by a front end portion of a vehicle body frame 5 pivotably by a handle 4.

The vehicle body frame 5 is of a cradle type supporting a head portion 6 integrally formed with the head pipe 3. An engine 8 is arranged on a lower side of a seat 7 along the center of the vehicle body therefrom. The engine 8 is of a water-cooled type, and is cooled by a radiator 9 The engine 8 intakes air from an air cleaner 10 arranged on the lower side of the seat 7 via a carburetor 11, and exhausts gas from an exhaust port via an exhaust pipe 12.

At a portion of the vehicle body frame 5 on the rear side of a crankcase 13 of the engine 8, front end portions of rear swing arms 14 are supported by a pivot shaft 15 swingable in the up and down direction. A rear cushion unit 16 is installed between the rear swing arms 14 and the vehicle body frame 5.

A rear wheel 17 is supported by rear end portions of the rear swing arms 14 and is driven by a drive side sprocket 20 of the crankcase 13 via a chain 19 along with a driven side sprocket 18 coaxially installed therewith. Numeral 21 designates a step bracket, numeral 22 designates a chain protector, numeral 23 designates a rear stay, numeral 24 designates a seat rail and numeral 25 designates a rear fender.

Figure 3:
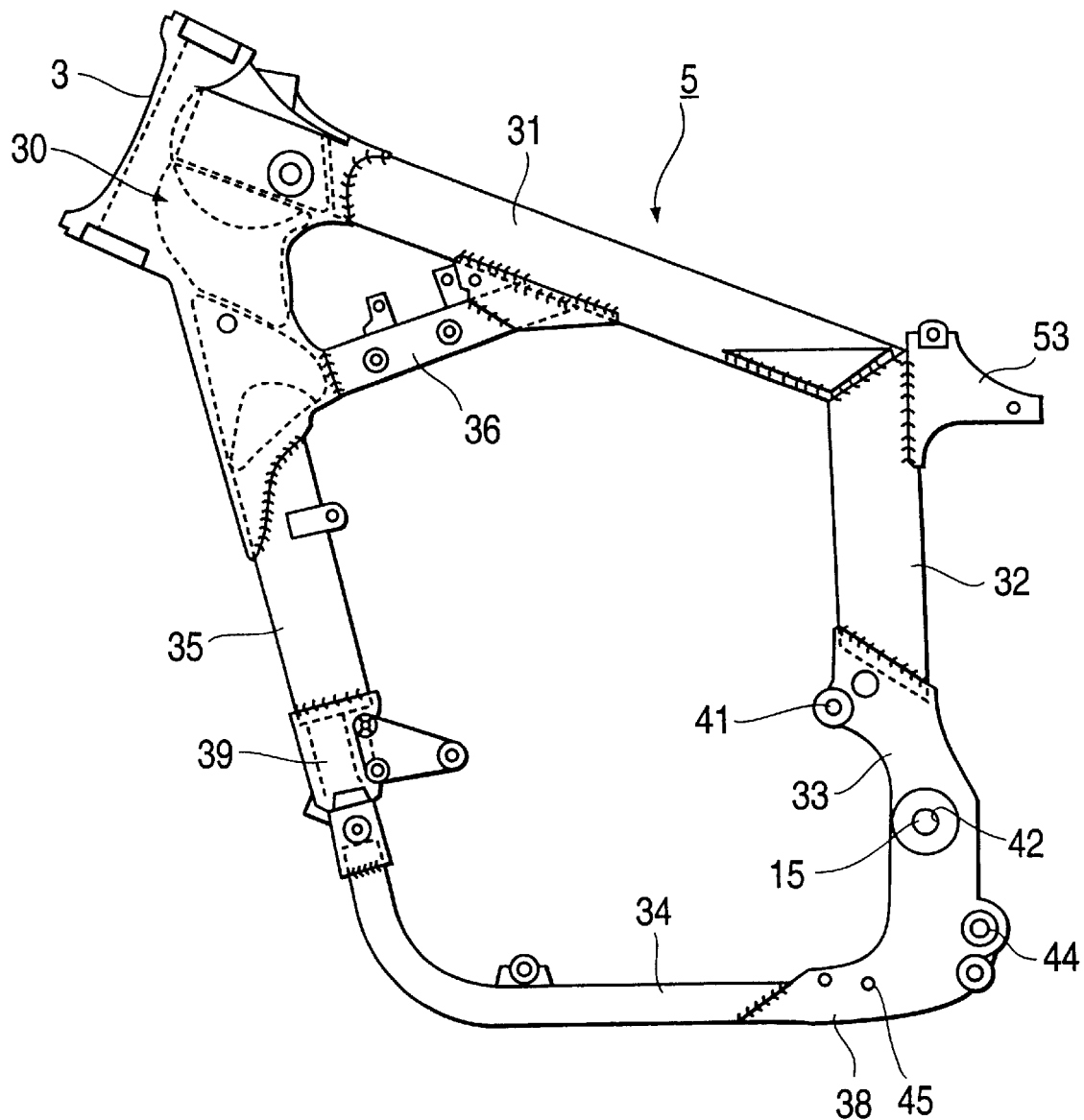
FIG. 3 is a side view of a vehicle body frame.

FIG. 3 shows details of a front half portion of the vehicle body frame 5 except for the rear stays 23 and the seat rails 24. The vehicle body frame 5 is formed in the shape of a loop in side view by a head pipe 30, a main pipe 31, a center pipe 32, a pivot frame 33, lower pipes 34, a down pipe 35 and a reinforcement pipe 36. Among them, single ones of the main pipe 31, the center pipe 32, the pivot frame 33 and the down pipe 35 are respectively arranged along the center of the vehicle body thus constituting a backbone type frame.

Further, there are respectively installed left end right pairs of the lower pipes 34 as well as the rear stays 23 and the seat rails 24. The illustration of them is omitted in the drawing. The head portion 30 is a hollow member cast by using a metal material such as an aluminum alloy or the like, and having the head pipe 3 integrated therewith.

The main pipe 31 is a straight member in the shape of a square pipe and made of a metal material such as an aluminum alloy or the like. A front end portion of the main pipe 31 is bonded to the head pipe 30 by welding, and a rear end portion thereof is obliquely cut and is brought into contact with and welded to an upper end portion of the center pipe 32 which is similarly obliquely cut.

The center pipe 32 is a straight square pipe member made of a metal material such as an aluminum alloy or the like. The center pipe 32 has a cross-section similar to that of the main pipe 31, and is welded to a rear end of the main pipe 31. A bracket 53 is welded to a rear face side of the center pipe 32 in the vicinity of the main pipe 31. The bracket 53 has an attachment portion 54 to be attached with the seat rails 24 and an attachment portion 55 to be attached with the rear cushion unit 16. The center pipe 32 extends downwardly on the rear side of the engine 8, and a lower end portion thereof which is cut obliquely is brought into contact with and welded to an upper end portion of the pivot frame 33 which is similarly formed.

The pivot frame 33 is fabricated by casting an aluminum alloy and constitutes a substantially U-shaped member opened to the front side. A pivot portion 15 is installed at an intermediary portion in the up and down direction of the pivot frame 33. A lower end portion of the pivot frame 33 includes lower pipe joint portions 38 to which rear end portions of the lower pipe 34 are fitted and welded. The pivot frame 33 constitutes the center frame of the application by being integrated with the center pipe 32 and details thereof will be described later.

The lower pipe 34 is arranged in the forward and rearward direction on the lower side of the engine 8 and front end portions thereof are bent upwardly and welded to a joint piece 39 which is welded to a lower end portion of the down pipe 35. The joint piece 39 constitutes the oil tank along with the down pipe 35 and the head pipe 30.

Figure 4:
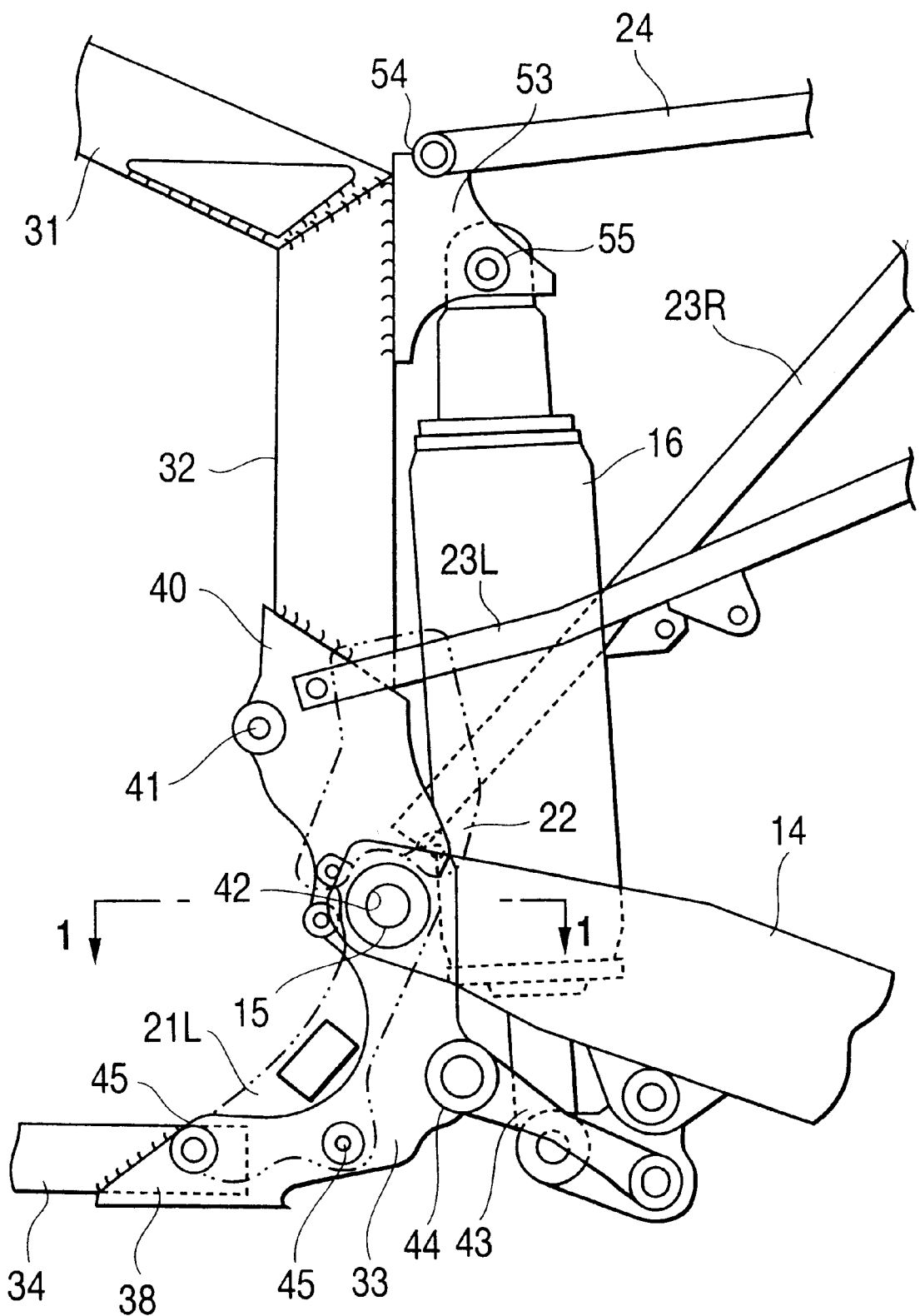
FIG. 4 is a side view partially enlarging the pivot portion.

Next, an explanation will be given of the pivot frame 33. Further, in the following explanation, among members constituting pairs in the left and right direction, with respect to numerals used in the previous explanation, a differentiation is made by adding R to the right and L to the left as necessary. As shown in FIG. 4, a left side rear stay 23L is attached at an upper portion of a left sidewall 40 of the pivot frame 33, and an engine hanger attaching boss 41 is located at a vicinity thereof.

An intermediary portion thereof is formed with a shaft hole 42 constituting the pivot portion 15. A lower rear side thereof includes a connecting portion 44 for a cushion link 43. A side face of the lower pipe joint portion 38 includes an attaching bosses 45 for a step bracket 21L.

Figure 1:
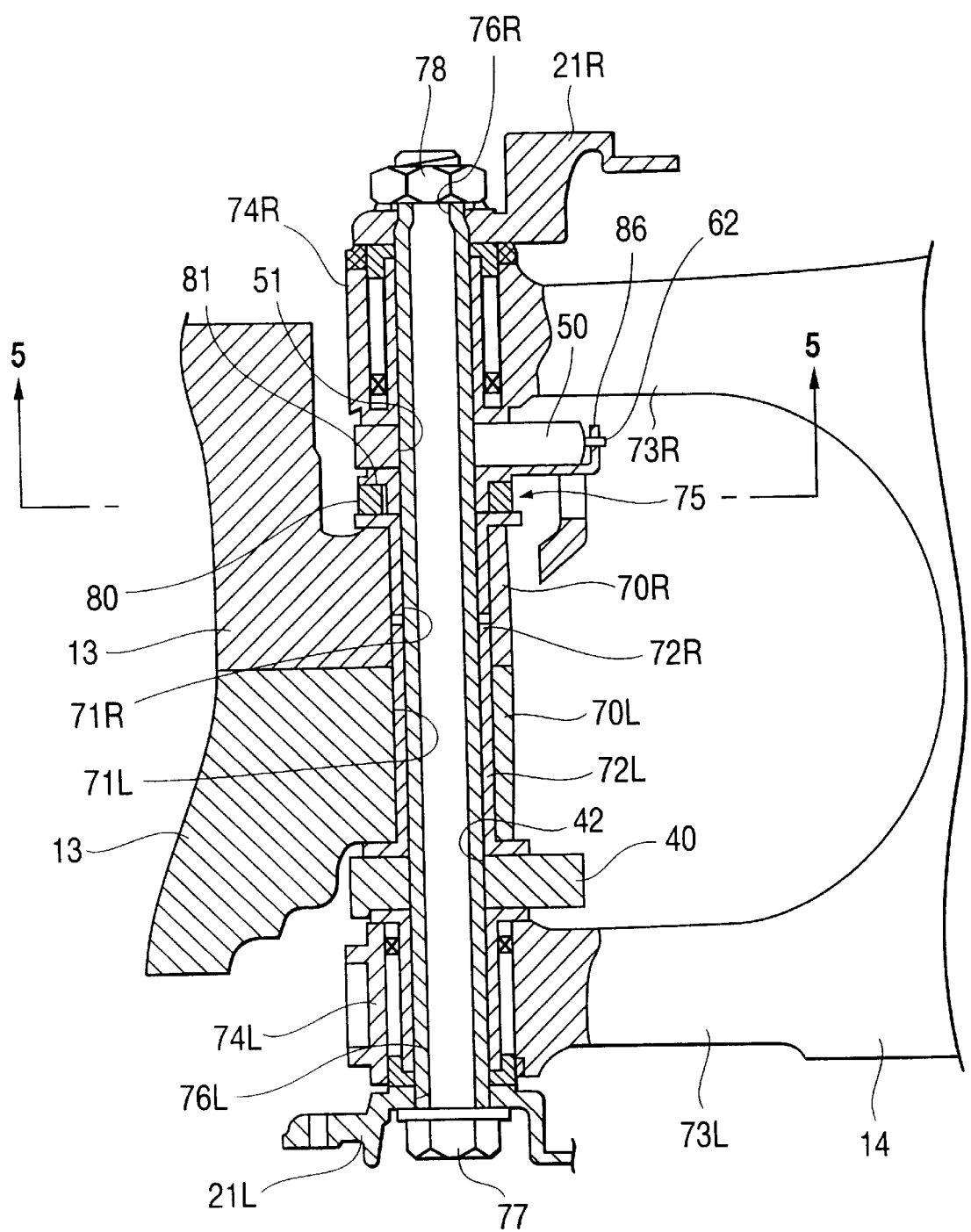
FIG. 1 is a sectional view of a pivot portion according to an embodiment taken along line 1—1 of FIG. 4.
Figure 6:
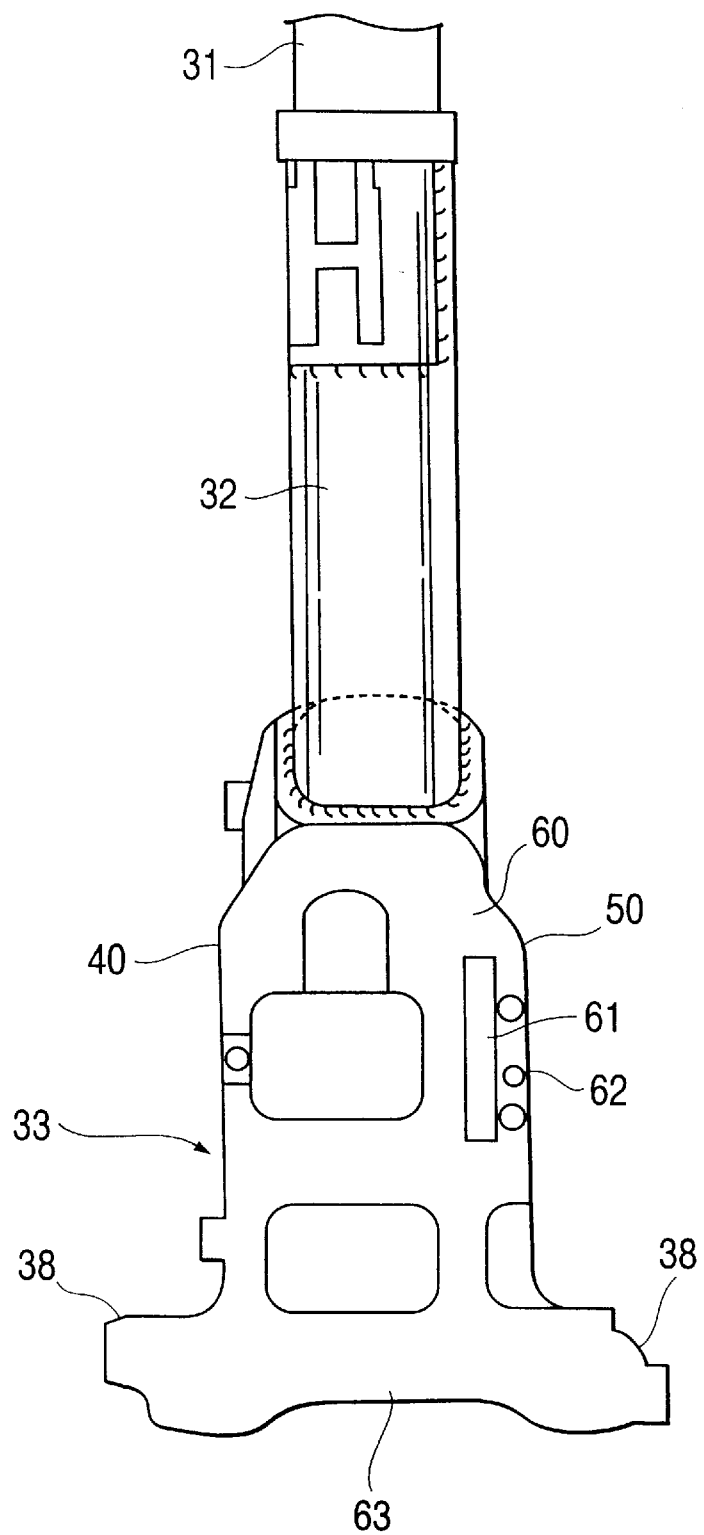
FIG. 6 is a rear view of a center frame.

As shown in FIG. 1, an intermediary portion of a right sidewall 50 of the pivot frame 33 includes a shaft hole 51, and a right side rear stay 23R is attached to a position in the vicinity thereof. As shown by FIG. 6, a window hole 61 is formed on a right side of an intermediary portion in the up and down direction of a rear face wall 60 at a position in the vicinity of the right sidewall 50. Further, stopper projections 62 are integrally formed which project in the rearward direction at positions in the vicinity of the connecting portion 52.

A lower portion of the rear face wall 60 of the pivot frame 33 is formed as a cross portion 63 for connecting the left sidewall 40 and the right sidewall 50 as well as left and right lower pipe joint portions 38.

Next, an explanation will be given of the structure of the pivot portion 15. As shown in FIG. 1, the crankcase 13 is formed of left and right portions. Flanged collars 72R and 72L are respectively fitted to through holes 71R and 71L of attaching bosses 70R and 70L which are formed to project rearwardly at an intermediary portion in the vehicle width direction at a rear end portion of the crankcase 13.

The attaching bosses 70R and 70L are inserted between the left sidewall 40 and the right sidewall 50 of the pivot frame 33. The through holes 71R and 71L are arranged coaxially with the shaft hole 42 and the shaft hole 51, and arranged coaxially with bearing potions 74R and 74L installed at respective front end portions of connecting arms 73R and 74L. The connecting arms 73R and 74L are formed to project forwardly at the right and left sides of a front end portion of the rear swing arm 14.

An adjustment collar 75 is coaxially interposed between one sidewall (right sidewall 50 according to the embodiment) and a corresponding one of a flanged collar (flanged collar 72R). Attaching holes 76R and 76L of the step bracket 21R and step bracket 21L are coaxially installed at the respective outer sides of the bearing portions 74R and 74L. A long pivot bolt 77 is inserted from one side and a nut 78 is fastened at the other side by which these respective members are connected and fastened up.

Figure 5:
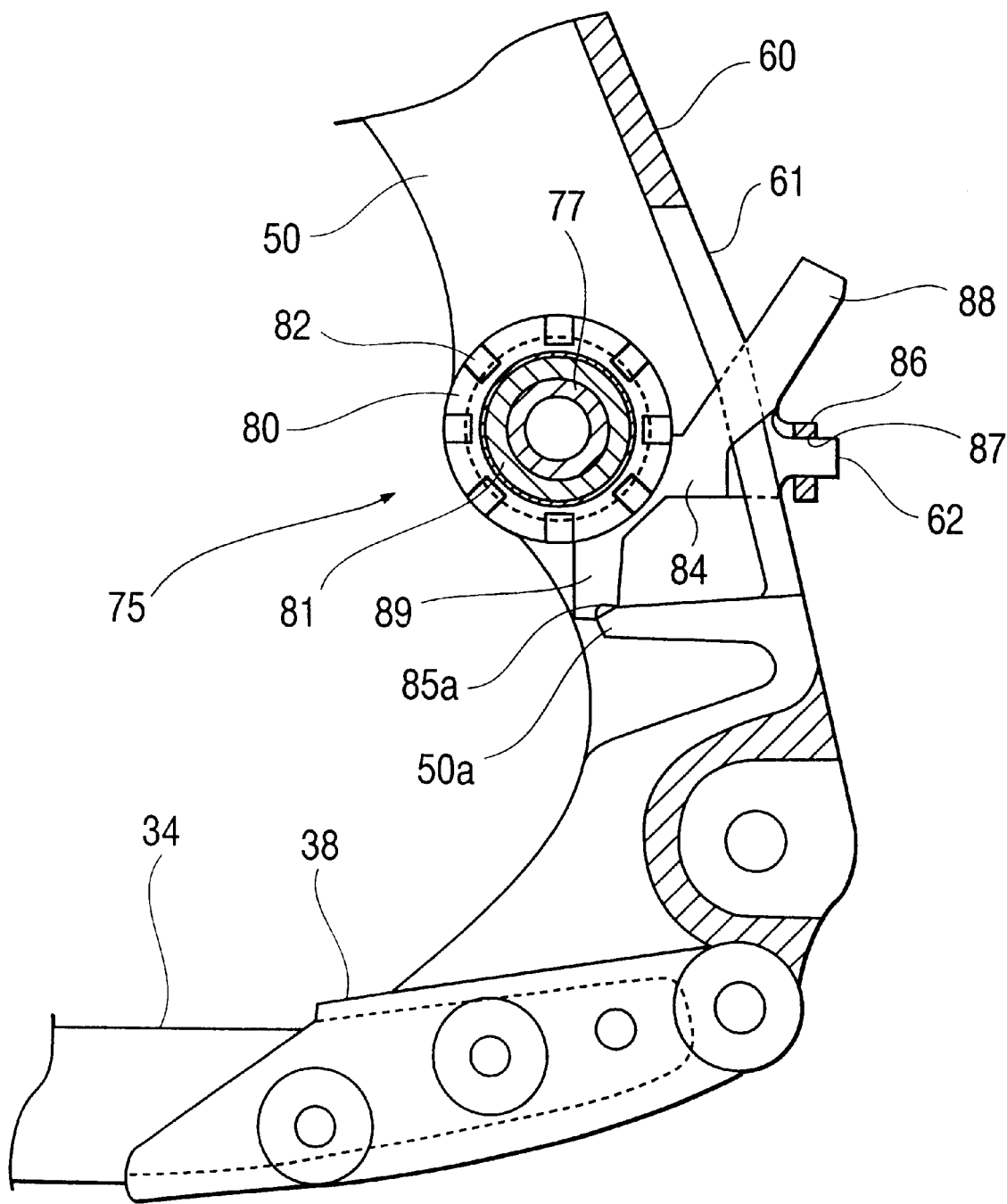
FIG. 5 is a section view showing a pivot adjustment collar portion taken along line 5—5 of FIG. 1.
Figure 7:
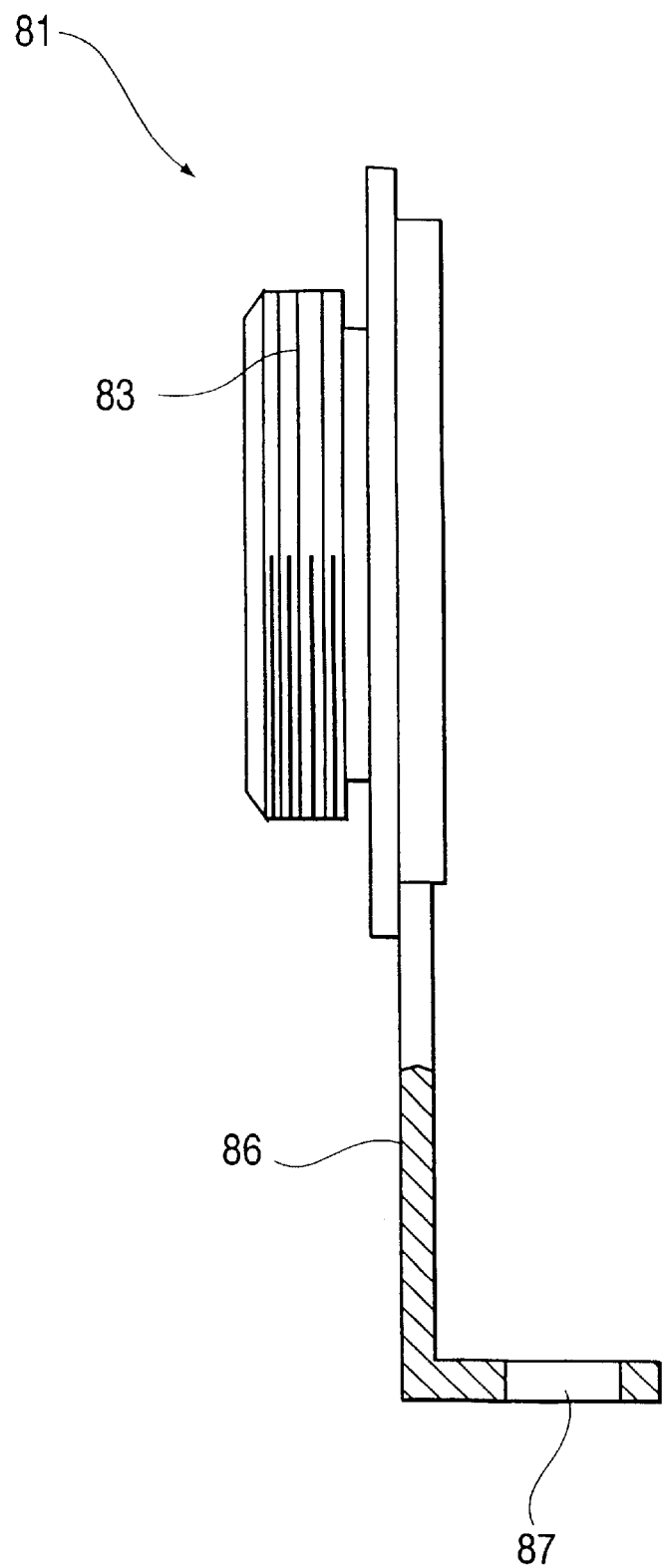
FIG. 7 is a view showing a fixed side adjustment collar.

As shown by FIGS. 1, 5 and 7, the adjustment collar 75 includes a movable portion 80 and a fixed portion 81. The movable portion 80 is formed as a nut with engaging grooves 82 as shown in FIG. 5 for engagement with a pivot tool for adjustment. The fixed portion 81 includes a threaded portion 83 and a detachment prevention plate 84. The detachment preventive plate 84 is a plate member which is brought into contact with a side face of the right sidewall 50. The detachment preventive plate 84 includes a lower extended portion 89 which includes a notched portion 85a. The notched portion 85a is fitted to a stepped portion 50a formed at a wall face of the right sidewall 50. The detachment preventive plate 84 includes a rearwardly projecting pivot lock portion 86 which extends through the window hole 61.

A rear end portion of the pivot lock portion 86 is bent substantially at a right angle, and a lock hole 87 is formed therein. One of the stopper projections 62 is passed through the lock hole 87 to thereby perform detachment prevention and pivot locking. The pivot lock portion 86 includes a knob portion 88 which extended therefrom in an upwardly skewed direction. The knob portion 88 projects outwardly through the window hole 61. The adjustment collar 75 is attached and detached by depressing the knob portion 88.

The adjustment collar 75 having the movable portion 80 and the fixed portion 81 integrated together can be withdrawn from and inserted into the window hole 61. Further, the movable portion 80 can be pivoted by inserting a pivoting tool through the window hole 61.

Next, an explanation will be given of the operation of the embodiment. The attaching bosses 70R and 70L of the crankcase 13 are matched together, and inserted between the left sidewall 40 and the right sidewall 50. The attaching bosses 70R and 70L are connected in a single axis by the pivot bolt 77, along with the bearing portions 74R and 74L of the rear swing arm 14. A nut 78 is fastened to a threaded portion of the pivot bolt 77, and an axial force is exerted to the left sidewall 40 and the right sidewall 50 to decrease a gap between the two members.

When an amount of fastening of the nut 78 is increased because of tolerances among the respective members, the amounts of bending of the left sidewall 40 and the right sidewall 50 are increased. Accordingly, residual stresses develop at the left sidewall 40 and the right sidewall 50. In the present invention, in order to make the fastening torque produced by the nut 78 constant, the length of the adjustment collar 75 in the axial direction is adjusted by pivoting the movable portion 80 with a tool inserted through the window hole 61. The adjustment collar is adjusted to reduce the tolerances among the fastening members by filling gap space that may exist between the assembled elements. Thereby, the left sidewall 40 and the right sidewall 50 can be fastened up without causing residual stresses, and fastening rigidity can be promoted.

The adjustment collar 75 can be withdrawn from and inserted into the window hole 61 and accordingly, the adjustment collar 75 can be attached thereto even after inserting the attaching bosses 70R and 70L between the left sidewall 40 and the right sidewall 50. The restriction on operational procedure is negligible and the operation can be made efficient.

The lower extended portion 89 is provided on the fixed portion 81 of the adjustment collar 75. The attaching operation is facilitated and the adjustment collar 75 can be easily manipulated by the knob portion 88. Further, by engaging the lock hole 87 of the pivot lock portion 86 with the stopper projection 62, pivot locking can be carried out simply.

The crankcase 13 and the rear swing arm 14 are fastened together with the pivot frame 33 constituting the vehicle body frame 5 by one axis of the pivot bolt 77, and therefore sufficient frame rigidity can be provided. Further, the pivot frame 33 is formed as a casting of an aluminum alloy. Therefore, the frame structure can be simplified and a number of parts can be reduced.

The present application invention is not limited to the above-described embodiment, but can be modified in various ways. For example, the adjustment collar 75 can be formed by an alternate structure having internal extension performance capable of expanding a dimension in the axial direction such that fastening tolerances can be adjusted after attachment of the pivot bolt 77.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vehicle frame structure comprising:

a crankcase including a mounting boss at a rear thereof, said mounting boss including an aperture therein;

a main frame including a pivot frame at a rear portion thereof, said pivot frame comprising a pair of spaced-apart sidewall members, said sidewall members each including an aperture therein;

a rear swing arm including a pair of spaced-apart connecting arms, said connecting arms each including an aperture therein;

a pivot pin extending through each of said apertures in said connecting arms, said sidewall members, and said mounting boss for pivotally attaching said rear swing arm to said pivot frame; and an adjustment device located between said mounting boss and one of said sidewall members, said adjustment device being adjustable in length in an axial direction of the pivot pin.

2. The vehicle frame structure according to claim 1, wherein said adjustment device comprises an adjustment collar including a fixed portion and a movable portion.

3. The vehicle frame structure according to claim 2, wherein the movable portion is formed as a nut with engaging grooves therein.

4. The vehicle frame structure according to claim 2, wherein the fixed portion includes a threaded portion and a detachment prevention plate.

5. The vehicle frame structure according to claim 4, wherein the detachment preventive plate includes a lower extended portion which includes a notched portion for engaging a stepped portion formed at a wall face of one of the sidewall members.

6. The vehicle frame structure according to claim 4, wherein the detachment preventive plate includes a rearwardly projecting pivot lock portion which extends through a slot in the pivot frame.

7. The vehicle frame structure according to claim 6, wherein a rear end portion of the pivot lock portion is bent substantially at a right angle, and a lock hole is formed therein.

8. The vehicle frame structure according to claim 7, wherein the pivot frame includes at least one stopper projection which passes through the lock hole.

9. The vehicle frame structure according to claim 6, wherein the pivot lock portion includes a knob portion which extends therefrom in an upwardly skewed direction.

10. The vehicle frame structure according to claim 9, wherein the knob portion projects outwardly through the slot in the pivot frame.

11. The vehicle frame structure according to claim 9, wherein the adjustment collar is attached and detached by depressing the knob portion.

12. The vehicle frame structure according to claim 6, wherein the adjustment collar having the movable portion and the fixed portion integrated together can be withdrawn from and inserted into the slot in the pivot frame.

13. The vehicle frame structure according to claim 6, wherein the movable portion may be pivoted by inserting a pivoting tool through the slot.

* * * * *